(12) United States Patent
Chen

(10) Patent No.: US 12,487,495 B2
(45) Date of Patent: Dec. 2, 2025

(54) ARRAY SUBSTRATE AND LIQUID CRYSTAL DISPLAY PANEL

(71) Applicant: TCL CHINA STAR OPTOELECTRONICS TECHNOLOGY CO., LTD., Guangdong (CN)

(72) Inventor: Yanling Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,145

(22) PCT Filed: Dec. 21, 2021

(86) PCT No.: PCT/CN2021/140183
§ 371 (c)(1),
(2) Date: Dec. 27, 2021

(87) PCT Pub. No.: WO2023/108731
PCT Pub. Date: Jun. 22, 2023

(65) Prior Publication Data
US 2024/0045294 A1    Feb. 8, 2024

(30) Foreign Application Priority Data
Dec. 17, 2021    (CN) .......................... 202111555023.5

(51) Int. Cl.
*G02F 1/1368*    (2006.01)
*G02F 1/1362*    (2006.01)

(52) U.S. Cl.
CPC ...... *G02F 1/1368* (2013.01); *G02F 1/136213* (2013.01)

(58) Field of Classification Search
CPC .. G02F 1/1368; G02F 1/136213; H10H 20/80
See application file for complete search history.

(56) References Cited

U.S. PATENT DOCUMENTS 7,688,414 B2 * 3/2010 Oh .................... G02F 1/136227
349/187
8,653,523 B2 * 2/2014 Sato ....................... H10D 86/60
257/66

(Continued)

FOREIGN PATENT DOCUMENTS

CN    1577014 A    2/2005
CN    1637474 A    7/2005

(Continued)

OTHER PUBLICATIONS

International Search Report in International application No. PCT/CN2021/140183, mailed on Aug. 25, 2022.

(Continued)

*Primary Examiner* — Kevin Quarterman
(74) *Attorney, Agent, or Firm* — PV IP PC; Wei Te Chung

(57) ABSTRACT

The application discloses an array substrate and a liquid crystal display panel. The array substrate includes a substrate, a common electrode, a first insulating layer, a pixel electrode and a storage electrode; A common electrode is disposed on one side of the substrate; the first insulating layer is disposed on one side of the common electrode away from the substrate; the pixel electrode is disposed on the side of the first insulating layer away from the common electrode; the storage electrode is disposed on one side of the common electrode close to or away from the first insulating layer, and the orthograph projection of the storage electrode on the plane where the substrate disposed overlaps at least (Continued)

partially with the orthograph projection of the pixel electrode on the plane where the substrate disposed.

18 Claims, 4 Drawing Sheets

(56) References Cited

U.S. PATENT DOCUMENTS

| | | | | |
|---|---|---|---|---|
| 9,025,096 | B2* | 5/2015 | Tae | G02F 1/1341 349/39 |
| 2011/0024753 | A1 | 2/2011 | Liou | |
| 2012/0104392 | A1 | 5/2012 | Son et al. | |

FOREIGN PATENT DOCUMENTS

| | | |
|---|---|---|
| CN | 103943564 A | 7/2014 |
| CN | 108227325 A | 6/2018 |
| CN | 112068371 A | 12/2020 |
| JP | H0580352 A | 4/1993 |
| JP | 6855848 B2 | 4/2021 |
| KR | 20080082293 A | 9/2008 |

OTHER PUBLICATIONS

Written Opinion of the International Search Authority in International application No. PCT/CN2021/140183, mailed on Aug. 25, 2022.

Chinese Office Action issued in corresponding Chinese Patent Application No. 202111555023.5 dated Jan. 5, 2023, pp. 1-7.

* cited by examiner

ARRAY SUBSTRATE AND LIQUID CRYSTAL DISPLAY PANEL

BACKGROUND OF INVENTION

Field of Invention

The present invention relates to a field of display technology, and in particular to an array substrate and a liquid crystal display panel.

Description of Prior Art

The display modes of liquid crystal display (LCD) panels include vertical alignment (VA) display mode and in plane switching (IPS) display mode. Among them, VA architecture is a common display mode for large-size LCD panels. Due to the particularity of VA architecture, the storage capacitor of pixels in the array substrate will be much smaller than that of IPS architecture.

At present, large-size business display devices are more and more widely used. The biggest advantage of large-size business LCD panel is to reduce the display power consumption as much as possible without affecting its display characteristics. The display power consumption is about tens of microwatts. Specifically, low-frequency driving can realize low-power display, but this driving form usually makes a frame time more than Is, resulting in too long pixel leakage time and unstable pixel voltage. Especially for the products with high resolution requirements, the pixel size is small and the pixel memory storage capacity space is insufficient. Therefore, under the condition of low-frequency driving, the high-resolution products can not meet the demand of pixel voltage maintenance.

SUMMARY OF INVENTION

The present invention provides an array substrate and a liquid crystal display panel to improve pixel voltage maintenance ability and meet design requirements of low-frequency drive and high-resolution products.

The present invention provides an array substrate, including:
- a substrate;
- a common electrode disposed on one side of the substrate;
- a first insulating layer disposed on one side of the common electrode away from the substrate;
- a pixel electrode disposed on one side of the first insulating layer away from the common electrode; and
- a storage electrode disposed on a side of the common electrode close to the first insulating layer or on a side of the common electrode away from the first insulating layer, wherein an orthograph projection of the storage electrode on a plane where the substrate disposed overlaps at least partially an orthograph projection of the pixel electrode on the plane where the substrate disposed.

In some embodiment of the array substrate, the storage electrode is connected to the common electrode.

In some embodiment of the array substrate, the storage electrode is located on the side of the common electrode away from the first insulating layer, and a surface of the storage electrode close to the common electrode is in contact with the common electrode.

In some embodiment of the array substrate, the orthograph projection of the storage electrode on the plane where the substrate disposed in the orthograph projection of the pixel electrode on the plane where the substrate disposed.

In some embodiment of the array substrate, the array substrate has a light-emitting region, and a pattern of the storage electrode is same as a pattern of a part of the pixel electrode located in the light-emitting region.

In some embodiment of the disclosure, the array substrate further includes a gate, the gate includes a first gate part and a second gate part connected to the first gate part, the first gate part is located on a side of the second gate part close to the substrate, the first gate part is disposed on a same layer with the storage electrode and spaced apart with the storage electrode, and the second gate part is disposed on a same layer with the common electrode and spaced apart with the common electrode.

In some embodiment of the disclosure, the array substrate further includes a drain, the drain is disposed on a side of the pixel electrode facing the first insulating layer, and the orthograph projection of the storage electrode on the plane where the substrate disposed overlaps with an orthograph projection of the drain on the plane where the substrate disposed.

In some embodiment of the array substrate, the orthograph projection of the storage electrode on the plane where the substrate disposed overlaps with an orthograph projection of the common electrode on the plane where the substrate disposed.

In some embodiment of the array substrate, the storage electrode and the common electrode are prepared by a same mask.

In some embodiment of the array substrate, the storage electrode is located on the side of the common electrode close to the first insulating layer, and a surface of the storage electrode close to the common electrode is in contact with the common electrode.

In some embodiment of the array substrate, the array substrate further includes an interlayer insulating layer, the interlayer insulating layer is disposed between the storage electrode and the common electrode, the interlayer insulating layer is provided with a connecting hole, and the storage electrode is connected to the common electrode through the connecting hole.

In some embodiment of the array substrate, the storage electrode is located on the side of the common electrode away from the first insulating layer, the array substrate further includes a gate, the gate includes a first gate part and a second gate part insulated from the first gate part, the first gate part is disposed on the a same layer with the storage electrode and spaced apart with the storage electrode, and the second gate part is disposed on the a same layer with the common electrode and spaced apart with the common electrode.

In some embodiment of the array substrate, the orthograph projection of the common electrode on the plane where the substrate disposed overlaps with an orthograph projection of the pixel electrode on the plane where the substrate disposed, a first storage capacitor is formed between the common electrode and the pixel electrode, a second storage capacitor is formed between the storage electrode and the pixel electrode, and the first storage capacitor is connected in parallel with the second storage capacitor.

The present invention further provides an array substrate, including:
- a substrate;
- a common electrode, disposed on one side of the substrate;

a first insulating layer, disposed on one side of the common electrode away from the substrate;

a pixel electrode, disposed on the side of the first insulating layer away from the common electrode, the orthograph projection of the common electrode on the plane where the substrate overlaps with an orthograph projection of the pixel electrode on the plane where the substrate disposed, and a first storage capacitor is formed between the common electrode and the pixel electrode; and a storage electrode disposed on a side of the common electrode close to the first insulating layer or on a side of the common electrode away from the first insulating layer, wherein an orthograph projection of the storage electrode on a plane of where the substrate disposed overlaps at least partially an orthograph projection of the pixel electrode on the plane of where the substrate disposed.

The present invention further provides a liquid crystal display panel, wherein the liquid crystal display panel includes an array substrate, a color film substrate, and a liquid crystal layer disposed between the array substrate and the color film substrate, and the array substrate is the array substrate of claim 1.

In some embodiment of the liquid crystal display panel, the storage electrode is connected to the common electrode.

In some embodiment of the liquid crystal display panel, the storage electrode is located on the side of the common electrode away from the first insulating layer, and a surface of the storage electrode close to the common electrode is in contact with the common electrode.

In some embodiment of the liquid crystal display panel, the orthograph projection of the storage electrode on the plane where the substrate disposed in the orthograph projection of the pixel electrode on the plane where the substrate disposed.

In some embodiment of the liquid crystal display panel, the array substrate has a light-emitting region, and a pattern of the storage electrode is same as a pattern of a part of the pixel electrode located in the light-emitting region.

In some embodiment of the liquid crystal display panel, the storage electrode and the common electrode are prepared by a same mask.

Compared with the array substrate in the prior art, the array substrate of the present application provides the storage electrode on the side of the common electrode away from the first insulating layer or close to the first insulating layer, and the positive projection of the storage electrode on the plane where the substrate is located partially overlapping the positive projection of the pixel electrode on the plane where the substrate is located at least. Because the storage electrode and the pixel electrode from a storage capacitor, to increase the capacitance in the pixel, so as to improve the pixel voltage maintenance ability of the display product, and to meet the design requirements of low-frequency drive and high-resolution products.

BRIEF DESCRIPTION OF DRAWINGS

In order to explain the embodiments or the technical solutions in the prior art more clearly, the following will briefly introduce the drawings that need to be used in the description of the embodiments or the prior art. The drawings in the following description are only for disclosure, for those of ordinary skill in the art, without creative work, other drawings can be obtained from these drawings.

DETAILED DESCRIPTION OF PREFERRED EMBODIMENTS

Figure 1:
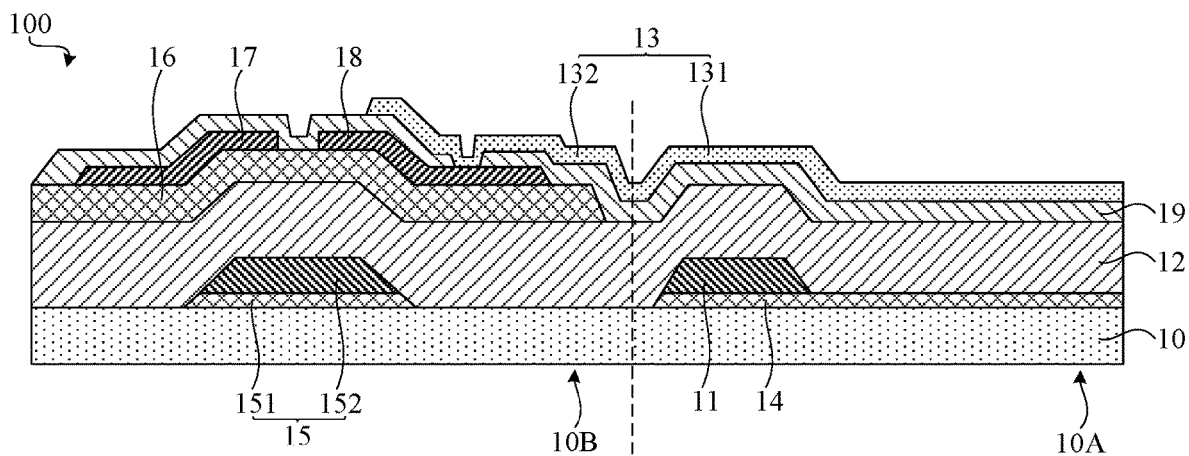
FIG. 1 is a schematic diagram of a cross-sectional structure of an array substrate provided in a first embodiment of the application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of this application. In addition, it should be understood that the specific implementations described here are only used to illustrate and explain the application, and are not used to limit the present application. In the present application, if no explanation is made to the contrary, the orientation words used such as "upper" and "lower" generally refer to the upper and lower positions of the device in actual use or working state, and specifically refer to the drawing directions in the drawings; and "inner" and "outer" refer to the outline of the device.

An embodiment of the present application provides an array substrate and a liquid crystal display panel. Detailed descriptions are given below. It should be noted that the order of description in the following embodiments is not meant to limit the preferred order of the embodiments.

The application provides an array substrate, which includes a substrate, a common electrode, a first insulating layer, a pixel electrode and a storage electrode. The common electrode is disposed on one side of the substrate. The first insulating layer is disposed on the side of the common electrode away from the substrate. The pixel electrode is disposed on one side of the first insulating layer away from the common electrode. The storage electrode is disposed on the side of the common electrode close to the first insulating layer or on the side of the common electrode away from the first insulating layer. A orthograph projection of the storage electrode on the plane where the substrate disposed at least partially overlaps the orthograph projection of the pixel electrode on the plane where the substrate disposed.

Therefore, the array substrate provided by the present application is provided with a storage electrode on the side where the common electrode is away from the first insulating layer or on the side where the common electrode is close to the first insulating layer, and the orthograph projection of the storage electrode on the plane where the substrate disposed overlaps at least partially with the orthograph projection of the pixel electrode on the plane where the substrate disposed. Since a storage capacitor will be formed between the storage electrode and the pixel electrode, the capacitance in the pixel can be increased, Thus, the pixel voltage maintenance ability of display products can be improved to meet the design requirements of low-frequency drive and high-resolution products.

The array substrate provided by the application is described in detail through specific embodiments.

Figure 2:
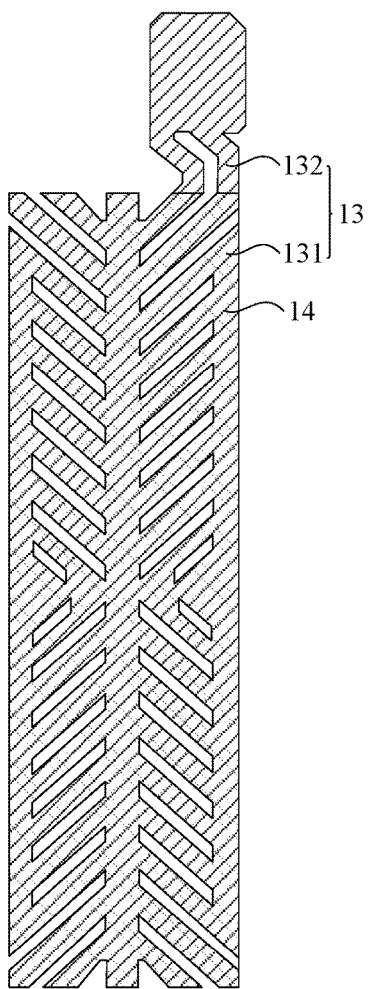
FIG. 2 is a schematic diagram of a plane structure of relative positions of a pixel electrode and a storage electrode in the array substrate provided by the first embodiment of the present application.
Figure 3:
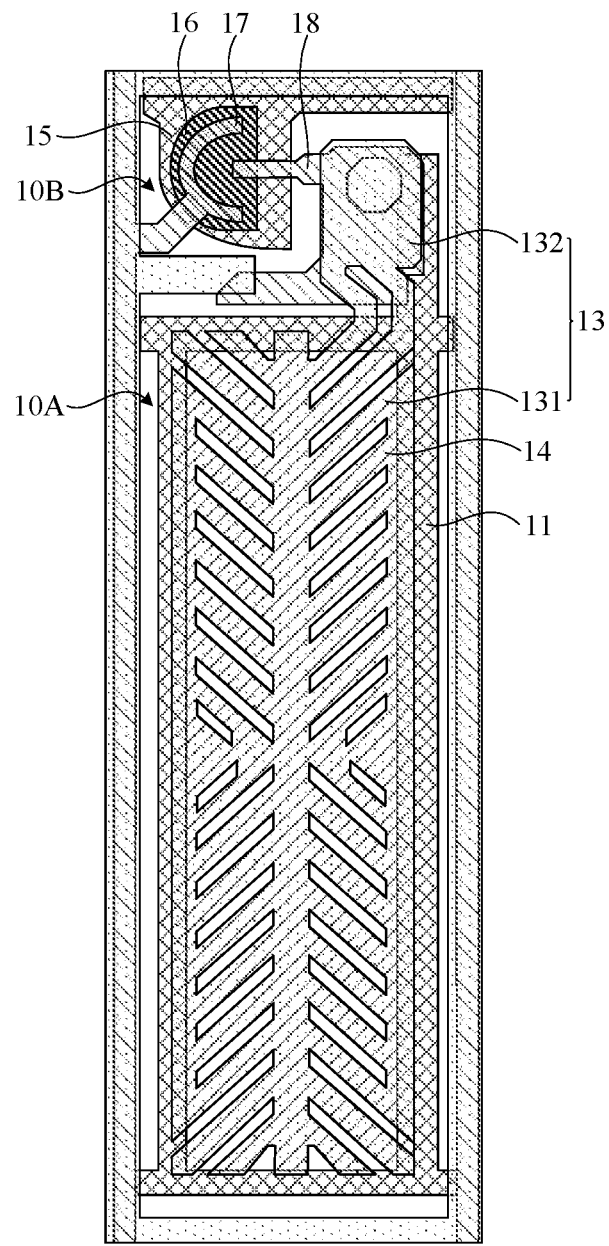
FIG. 3 is a schematic diagram of a plane structure of the array substrate provided in the first embodiment of the application.

Please refer to FIG. 1 to FIG. 3, The first embodiment of the present application provides an array substrate 100. Array substrate 100 includes a substrate 10, a common electrode 11, a first insulating layer 12, a pixel electrode 13 and a storage electrode 14. The common electrode 11 is disposed on one side of the substrate 10. The first insulating layer 12 is disposed on the side of the common electrode 11 away from the substrate 10. The pixel electrode 13 is disposed on one side of the first insulating layer 12 away from the common electrode 11. The storage electrode 14 is disposed on the side of the common electrode 11 close to the first insulating layer 12 or on the side of the common electrode 11 away from the first insulating layer 12. A orthograph projection of the storage electrode 14 on the plane where the substrate 10 disposed at least partially overlaps the orthograph projection of the pixel electrode 13 on the plane where the substrate 10 disposed.

Specifically, the substrate 10 may be a hard substrate, such as a glass substrate. Alternatively, the substrate 10 may be a flexible substrate, such as a polyimide substrate. The material of the substrate 10 is not specifically limited in the present application.

The orthograph projection of the common electrode 11 on the plane where the substrate 10 disposed overlaps with the orthograph projection of the pixel electrode 13 on the plane where the substrate 10 disposed, that is, a first storage capacitor is formed between the common electrode 11 and the pixel electrode 13. In addition, since the orthograph projection of the storage electrode 14 on the plane where the substrate 10 disposed overlaps at least partially with the orthograph projection of the pixel electrode 13 on the plane where the substrate 10 disposed, that is, a second storage capacitor is formed between the storage electrode 14 and the pixel electrode 13. Thus, through the parallel connection of the first storage capacitor and the second storage capacitor, the total storage capacitor in the pixel can be greatly increased, so as to improve the pixel voltage maintenance ability.

Specifically, the array substrate 100 has a light-emitting region 10A and a driving region 10B located on one side of the light-emitting region 10A. Wherein, the pixel electrode 13 includes a first pixel electrode part 131 and a second pixel electrode part 132 connected to the first pixel electrode part 131. The first pixel electrode part 131 is located in the light-emitting region 10A. The second pixel electrode part 132 is located in the driving region 10B. The first pixel electrode part 131 includes a trunk electrode (not identified in the figure) and a branch electrode (not identified in the figure) connected to the trunk electrode. The trunk electrode divides the pixel electrode 13 into four regions. The branch electrode is connected with the corresponding trunk electrode, and a slit is formed between the adjacent branch electrodes. The related technologies are the prior art and will not be repeated here.

In this embodiment, the orthograph projection of the storage electrode 14 on the plane where the substrate 10 disposed is located in the orthograph projection of the pixel electrode 13 on the plane where the substrate 10 disposed. Further, the pattern of the storage electrode 14 is same as the pattern of a part of the pixel electrode 13 located in the light-emitting region 10A. That is, as shown in FIG. 2 and FIG. 3, the pattern of the storage electrode 14 is same as the pattern of the first pixel electrode portion 131, that is, the orthograph projection of the storage electrode 14 on the plane where the substrate 10 disposed completely overlaps the orthograph projection of the first pixel electrode part 131 on the plane where the substrate 10 disposed. The above setting can increase the second storage capacitance formed between the storage electrode 14 and the pixel electrode 13, which is conducive to increasing the total storage capacitance in the pixel, so as to further improve the pixel voltage maintenance ability. In addition, in this embodiment, by setting the pattern of the storage electrode 14 same as the pattern of the first pixel electrode part 131, when the array substrate 100 is applied to the liquid crystal display panel of the VA architecture, the pixel electrode 13 can be used to shield the electric field between the storage electrode 14 and the common electrode on the color film substrate side, Thus, it is possible to avoid affecting the display effect of the liquid crystal display panel due to the setting of the storage electrode 14.

It should be noted that in some embodiments, the pattern of the storage electrode 14 may also be same as a part of the pattern of the first pixel electrode part 131, that is, the orthograph projection of the storage electrode 14 on the plane where the substrate 10 disposed and the orthograph projection of the first pixel electrode part 131 on the plane where the substrate 10 may partially overlap. In the actual process, The overlapping area of the storage electrode 14 and the first pixel electrode part 131 can be designed according to the demand for pixel memory storage capacitance, which will not be repeated here.

Furthermore, the storage electrode 14 is connected to the common electrode 11, that is, the storage electrode 14 and the common electrode 11 share the same electrode. The common electrode means that the storage electrode 14 and the common electrode 11 are connected to the same voltage signal. For example, the common voltage signal can be transmitted to the storage electrode 14 through the common electrode 11, so as to avoid increasing the difficulty of line design due to the additional setting of the signal source transmitting the voltage signal to the storage electrode 14, so as to improve the pixel voltage maintenance ability, also simplify the circuit design and save the process cost.

In the present embodiment, a surface of the storage electrode 14 close to the common electrode 11 is in contact with the common electrode 11. The storage electrode 14 and the common electrode 11 can be prepared by a same mask. Therefore, in this embodiment, the storage electrode 14 can be formed without increasing the number of masks, thereby avoiding the increase of process manufacturing cost.

Specifically, in combination with FIG. 1 and FIG. 3, the array substrate 100 further includes a gate 15, an active layer 16, a source 17, a drain 18 and a second insulating layer 19. Wherein, the gate 15 is disposed between the substrate 10 and the first insulating layer 12. Gate 15 is located in driving region 10B. The gate 15 includes a first gate part 151 and a second gate part 152 connected to the first gate part 151. The first gate part 151 is located on a side of the second gate part 152 close to the substrate 10. The first gate part 151 is disposed on a same layer with the storage electrode 14 and spaced apart with the storage electrode 14. Specifically, the material of the storage electrode 14 is the same as that of the first gate part 151, and may include a transparent conductive material such as ITO or IZO. The second gate part 152 is disposed on a same layer with the common electrode 11 and spaced apart with the common electrode 11. Specifically, the material of the common electrode 11 is the same as that of the second gate part 152, and may include one or more of copper, aluminum, titanium and molybdenum.

In this embodiment, the gate 15, the common electrode 11, and the storage electrode 14 are prepared by a same mask. Wherein, a halftone mask may be used to form the gate 15, the common electrode 11, and the storage electrode 14. Specifically, first, a first electrode layer is formed on the substrate 10; then, a first metal layer is formed on the first electrode layer; finally, under the same halftone mask, through exposure, development, and etching processes, So that the first electrode layer is formed as the first gate part 151 and the storage electrode 14, and the first metal layer is formed as the second gate part 152 and the common electrode 11.

In this embodiment, the first insulating layer 12 is a gate insulating layer. The first insulating layer 12 extends from the light-emitting region 10A to the driving region 10B. Wherein, the material of the first insulating layer 12 may include one or more of silicon oxide, silicon nitride, and silicon oxynitride.

The active layer 16 is located on one side of the first insulating layer 12 away from the gate 15. The active layer 16 is located in the driving region 10B. The material of the active layer 16 may be amorphous silicon, low-temperature polysilicon or metal oxide. The metal oxide may include one or more of IGZO, IGTO, IZTO, IGZTO, IZO, and ITO.

The source 17 and the drain 18 are disposed on one side of the active layer 16 away from the first insulating layer 12. The source 17 and the drain 18 are located in the driving region 10B. The source 17 and the drain 18 are connected to the active layer 16 respectively. The material of the source 17 and the material of the drain 18 are the same, and both may include one or more of copper, aluminum, molybdenum, and titanium.

The second insulating layer 19 is disposed on one side of the drain 18 away from the active layer 16. The second insulating layer 19 extends from the light-emitting region 10A to the driving region 10B. Wherein, the material of the second insulating layer 19 may include one or more of silicon oxide, silicon nitride, and silicon oxynitride.

The pixel electrode 13 is located on one side of the second insulating layer 19 away from the drain 18. The pixel electrode 13 is connected to the drain 18 through a via hole (not identified in the figure) in the second insulating layer 19. Specifically, the second pixel electrode part 132 is connected to the drain 18.

It should be noted that the planar structure in FIG. 3 also comprises a data line (not identified in the figure) and a DBS electrode (not identified in the figure) covering the data line. The related technologies are all prior art and will not be repeated here.

In summary, in the array substrate 100 provided by the first embodiment of the present application, the storage electrode 14 is disposed on one side of the common electrode 11 away from the first insulating layer 12, and the storage electrode 14 and the part of the pixel electrode 13 in the light-emitting area 10A are completely crossed. On the basis of forming a first storage capacitor between the common electrode 11 and the pixel electrode 13, by forming a second storage capacitor between the storage electrode 14 and the pixel electrode 13, the first storage capacitor and the second storage capacitor are connected in parallel, the total storage capacitance in the pixel is greatly improved, thereby improving the pixel voltage maintenance ability to meet the design requirements of low-frequency drive and high-resolution products. In addition, by making the storage electrode 14 and the common electrode 11 a common electrode, the storage electrode 14 and the common electrode 11 can be connected to the same voltage signal, thereby simplifying the circuit design. Further, since the storage electrode 14 and the common electrode 11 in this embodiment can be prepared by using the same halftone mask, the storage electrode 14 can be formed without increasing the number of masks, thereby avoiding an increase in process manufacturing cost.

Figure 4:
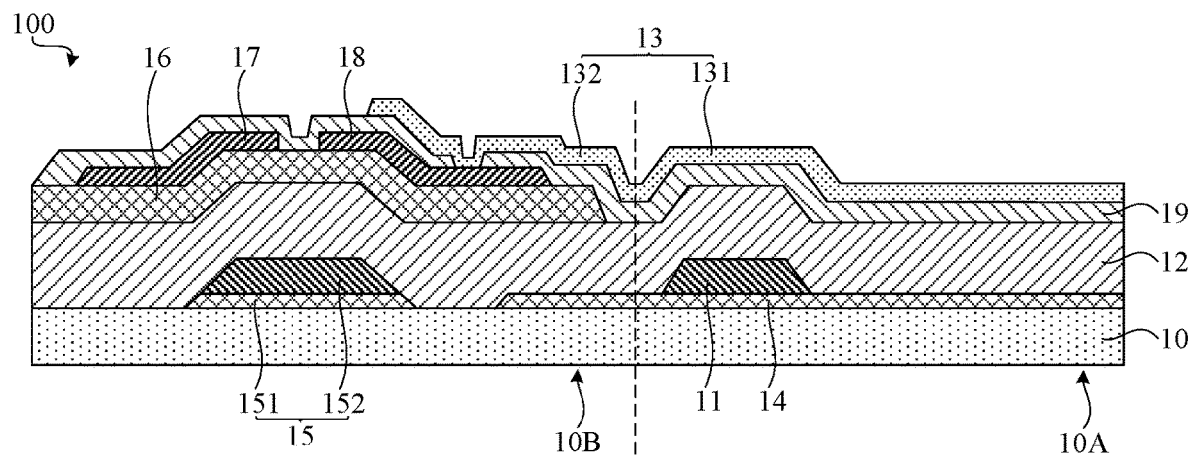
FIG. 4 is a schematic diagram of a cross-sectional structure of an array substrate provided in a second embodiment of the application.

Please refer to FIG. 4, the second embodiment of the present application provides an array substrate 100. The array substrate 100 provided in the second embodiment of the application is different from the first embodiment in that the orthograph projection of the storage electrode 14 on the plane where the substrate 10 disposed and the drain 18 overlap with the orthograph projection of the plane where the substrate 10 disposed.

In this embodiment, the orthograph projection of the storage electrode 14 on the plane where the substrate 10 disposed and the orthograph projection of the drain 18 on the plane where the substrate 10 disposed overlap, that is, the storage electrode 14 and the drain 18 overlap each other, so that a third storage capacitor can be formed between the storage electrode 14 and the drain 18, and through the parallel connection of the first storage capacitor, the second storage capacitor and the third storage capacitor, The total storage capacitor in the pixel can be further increased, so that the pixel voltage maintenance ability can be further improved.

Specifically, the storage electrode 14 extends from the common electrode 11 in a direction close to the gate 15. The orthograph projection of the storage electrode 14 on the plane where the substrate 10 disposed overlaps the orthograph projection of the second pixel electrode portion 132 on the plane where the substrate 10 disposed.

It should be noted that in this embodiment, since the gate 15 and the second pixel electrode part 132 are overlapped in the vertical direction, the part of the storage electrode 14 in the driving region 10B can only overlap with the second pixel electrode part 132, so as to avoid signal interference caused by conduction between the storage electrode 14 and the gate 15. In some embodiments, when the gate 15 and the second pixel electrode part 132 are spaced in the vertical direction, the part of the storage electrode 14 in the driving region 10B can completely overlap with the second pixel electrode part 132. At this time, the orthograph projection of the storage electrode 14 on the plane where the substrate 10 disposed completely overlaps with the orthograph projection of the pixel electrode 13 on the plane where the substrate 10 disposed, that is, The pattern of the storage electrode 14 is consistent with the pattern of the pixel electrode 13 and will not be repeated here.

Figure 5:
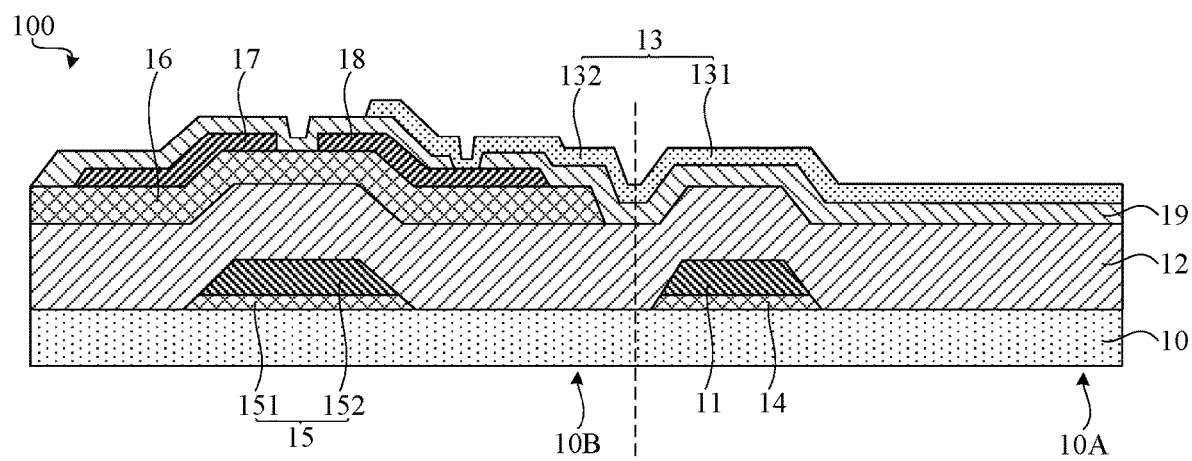
FIG. 5 is a schematic diagram of a cross-sectional structure of an array substrate provided in a third embodiment of the application.

Please refer to FIG. 5, the third embodiment of the present application provides an array substrate 100. The array substrate 100 provided in the third embodiment of the application is different from the first embodiment in that the orthograph projection of the storage electrode 14 on the plane where the substrate 10 disposed overlaps with the orthograph projection of the common electrode 11 on the plane where the substrate 10 disposed.

Specifically, a pattern of the storage electrode 14 is same as a pattern of the common electrode 11. Under the above setting, the storage electrode 14 and the common electrode 11 can be prepared by a same gray-scale mask to form the storage electrode 14 without increasing the number of masks, thereby avoiding the increase of process manufacturing cost.

Figure 6:
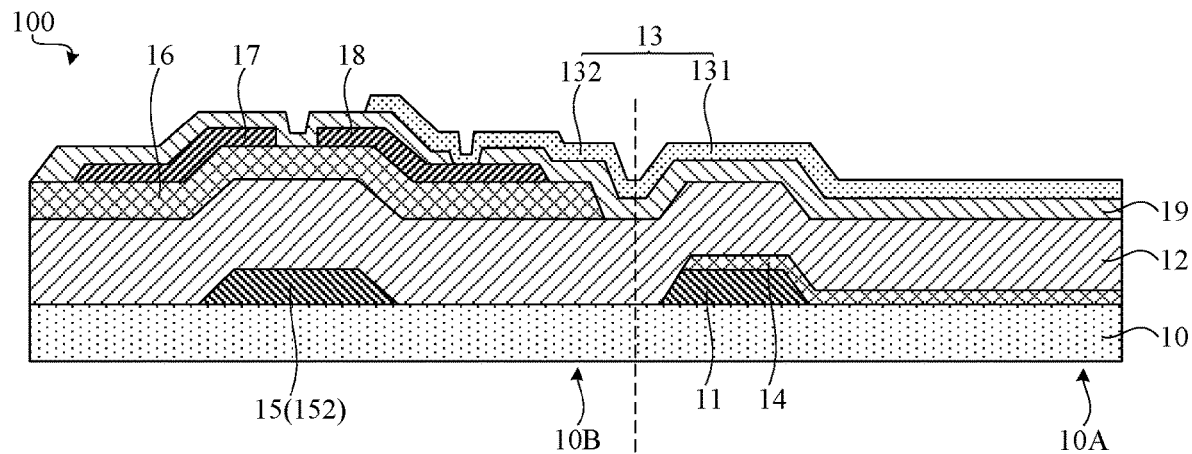
FIG. 6 is a schematic diagram of a cross-sectional structure of an array substrate provided in a fourth embodiment of the application.

Please refer to FIG. 6, the fourth embodiment of the present application provides an array substrate 100. The array substrate 100 provided in the fourth embodiment of the present application is different from the first embodiment in that the storage electrode 14 is located on the side of the common electrode 11 close to the first insulating layer 12.

In the present embodiment, the second gate part 152 is the gate 15. At this time, the second gate part 152 is in direct contact with the substrate 10. The above structure may omit the setting of the first gate part 151. The second gate part 152 and the common electrode 11 are prepared by a mask, and the storage electrode 14 is prepared by an additional mask. Of course, in some embodiments, the setting of the first gate part 151 may also be retained. At this time, the structure of the gate 15 is the same as that of the gate 15 in the first embodiment, and will not be repeated here.

Figure 7:
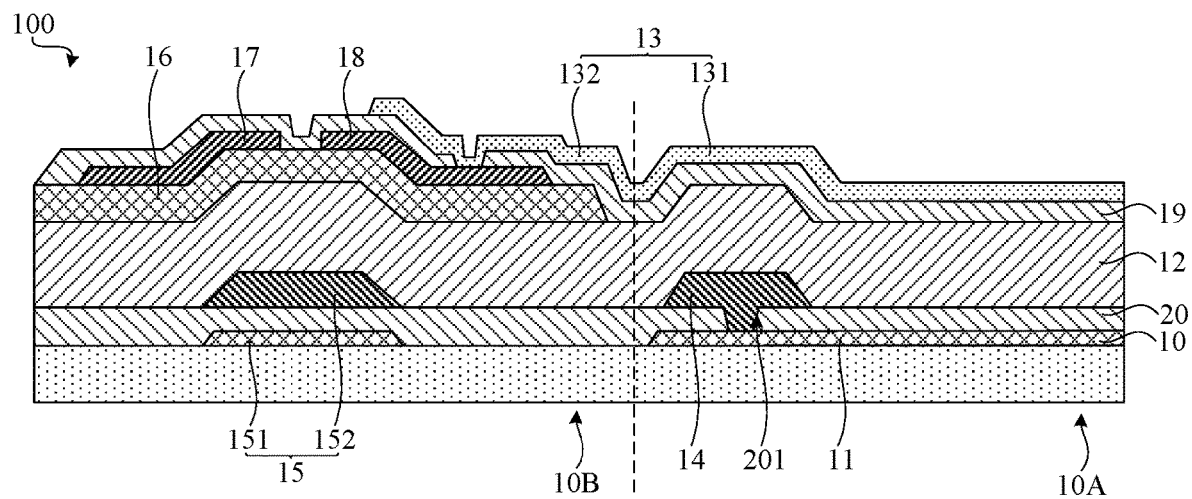
FIG. 7 is a schematic diagram of a cross-sectional structure of an array substrate provided in a fifth embodiment of the application.

Please refer to FIG. 7, the fifth embodiment of the present application provides an array substrate 100. The array substrate 100 provided in the fifth embodiment of the application is different from the first embodiment in that the array substrate 100 further includes an interlayer insulating layer 20, the interlayer insulating layer 20 is disposed between the storage electrode 14 and the common electrode 11, the interlayer insulating layer 20 is provided with a connecting hole 201, and the storage electrode 14 is connected to the common electrode 11 through the connecting hole 201, The first gate part 151 and the second gate part 152 are insulated by the interlayer insulating layer 20.

In this embodiment, the storage electrode 14 is connected to the common electrode 11 through the connection hole 201 in the interlayer insulating layer 20, so that the common voltage signal is transmitted to the storage electrode 14 through the common electrode 11, so as to avoid increasing the difficulty of line design due to the additional setting of the signal source transmitting the voltage signal to the storage electrode 14, so as to improve the pixel voltage maintenance ability, and it can simplify the circuit design and save the process cost.

Furthermore, since the first gate part 151 and the second gate part 152 in the present embodiment are insulated to form a double gate structure, the present embodiment can improve the stability of the thin film transistor and help to improve the response speed of the thin film transistor.

It should be noted that in some embodiments, the first gate part 151 can also be omitted. At this time, the second gate part 152 is the gate 15, which will not be repeated here.

Figure 8:
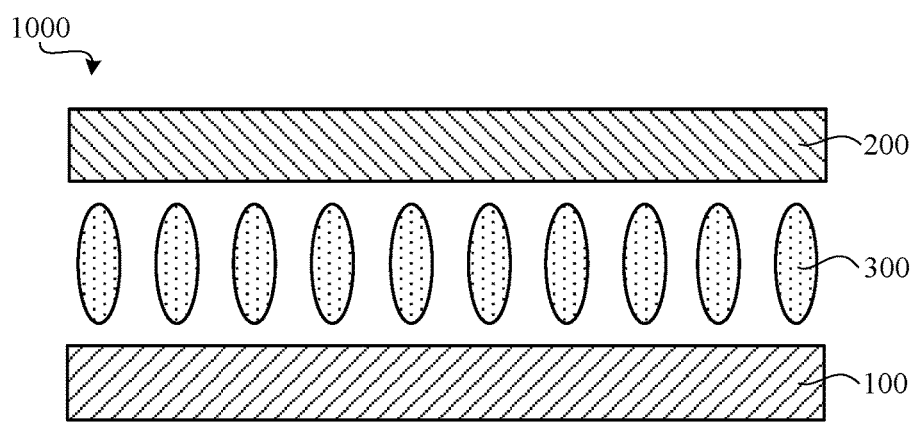
FIG. 8 is a schematic diagram of a cross-sectional structure of a liquid crystal display panel provided by the present application.

Please refer to FIG. 8, the present application also provides a liquid crystal display panel 1000. The liquid crystal display panel 1000 includes an array substrate 100, a color film substrate 200, and a liquid crystal layer 300 disposed between the array substrate 100 and the color film substrate 200. The array substrate 100 can be the array substrate 100 described in any of the above embodiments, and the specific structure of the array substrate 100 can refer to the description of the above embodiments, which will not be repeated here.

In the present embodiment, the liquid crystal display panel 1000 may be a VA display mode. The color film substrate 200 includes a substrate not identified in the figure) and a common electrode (not identified in the figure) disposed on one side of the substrate facing the liquid crystal layer 200. The related technologies are the prior art and will not be described here.

In the present application, when the array substrate 100 is the array substrate 100 described in the first embodiment, since the pattern of the storage electrode 14 in the array substrate 100 is consistent with the pattern of the pixel electrode 13, the electric field between the storage electrode 14 and the common electrode in the color film substrate 200 is shielded by using the pixel electrode 13, The setting of the storage electrode 14 can avoid affecting the display effect of the liquid crystal display panel 1000, and can increase the total storage capacitor of the pixel and improve the pixel voltage maintenance ability without affecting the display effect of the liquid crystal display panel 1000, so as to meet the design requirements of low frequency drive and high-resolution display products.

The above describes in detail an array substrate and a liquid crystal display panel provided by the embodiments of the present application. Specific examples are used in the present application to illustrate the principles and implementation of this application. The descriptions of the above examples are only used to help understand the methods and core ideas of the present application; at the same time, according to the principles of the present application, those skilled in the art will have changes in the thinking, specific implementation and application scope. In summary, the content of this specification should not be construed as a limitation to the present application.

What is claimed is:

1. An array substrate, comprising:
    a substrate;
    a common electrode disposed on one side of the substrate;
    a first insulating layer disposed on one side of the common electrode farthest away from the substrate;
    a pixel electrode disposed on one side of the first insulating layer farthest away from the common electrode; and
    a storage electrode disposed on a side of the common electrode closest to the first insulating layer or on a side of the common electrode farthest away from the first insulating layer, wherein an orthograph projection of the storage electrode on a plane where the substrate disposed is within an orthograph projection of the pixel electrode on the plane where the substrate disposed.

2. The array substrate according to claim 1, wherein the storage electrode is connected to the common electrode.

3. The array substrate according to claim 2, wherein the storage electrode is located on the side of the common electrode farthest away from the first insulating layer, and a surface of the storage electrode closest to the common electrode is in contact with the common electrode.

4. The array substrate according to claim 1, wherein the array substrate has a light-emitting region, and a pattern of the storage electrode is same as a pattern of a part of the pixel electrode located in the light-emitting region.

5. The array substrate according to claim 4, wherein the array substrate further comprises a gate, the gate comprises a first gate part and a second gate part connected to the first gate part, the first gate part is located on a side of the second gate part closest to the substrate, the first gate part is disposed on a same layer with the storage electrode and spaced apart with the storage electrode, and the second gate part is disposed on a same layer with the common electrode and spaced apart with the common electrode.

6. The array substrate according to claim 1, wherein the array substrate further comprises a drain, the drain is disposed on a side of the pixel electrode facing the first insulating layer, and the orthograph projection of the storage electrode on the plane where the substrate disposed overlaps with an orthograph projection of the drain on the plane where the substrate disposed.

7. The array substrate according to claim 3, wherein the orthograph projection of the storage electrode on the plane where the substrate disposed overlaps with an orthograph projection of the common electrode on the plane where the substrate disposed.

8. The array substrate according to claim 3, wherein the storage electrode and the common electrode are prepared by a same mask.

9. The array substrate according to claim 2, wherein the storage electrode is located on the side of the common electrode closest to the first insulating layer, and a surface of the storage electrode closest to the common electrode is in contact with the common electrode.

10. The array substrate according to claim 2, wherein the array substrate further comprises an interlayer insulating layer, the interlayer insulating layer is disposed between the storage electrode and the common electrode, the interlayer insulating layer is provided with a connecting hole, and the storage electrode is connected to the common electrode through the connecting hole.

11. The array substrate according to claim 10, wherein the storage electrode is located on the side of the common electrode farthest away from the first insulating layer, the array substrate further comprises a gate, the gate comprises a first gate part and a second gate part insulated from the first gate part, the first gate part is disposed on the a same layer with the storage electrode and spaced apart with the storage electrode, and the second gate part is disposed on the same layer with the common electrode and spaced apart with the common electrode.

12. The array substrate according to claim 1, wherein the orthograph projection of the common electrode on the plane where the substrate disposed overlaps with an orthograph projection of the pixel electrode on the plane where the substrate disposed, a first storage capacitor is formed between the common electrode and the pixel electrode, a second storage capacitor is formed between the storage electrode and the pixel electrode, and the first storage capacitor is connected in parallel with the second storage capacitor.

13. An array substrate, comprising:
a substrate;
a common electrode, disposed on one side of the substrate;
a first insulating layer, disposed on one side of the common electrode farthest away from the substrate;
a pixel electrode, disposed on the side of the first insulating layer farthest away from the common electrode, the orthograph projection of the common electrode on the plane where the substrate overlaps with an orthograph projection of the pixel electrode on the plane where the substrate disposed, and a first storage capacitor is formed between the common electrode and the pixel electrode; and
a storage electrode disposed on a side of the common electrode closest to the first insulating layer or on a side of the common electrode farthest away from the first insulating layer, wherein an orthograph projection of the storage electrode on a plane of where the substrate disposed is within an orthograph projection of the pixel electrode on the plane of where the substrate disposed.

14. A liquid crystal display panel, wherein the liquid crystal display panel comprises an array substrate, a color film substrate, and a liquid crystal layer disposed between the array substrate and the color film substrate, and the array substrate comprises:
a substrate;
a common electrode disposed on one side of the substrate;
a first insulating layer disposed on one side of the common electrode farthest away from the substrate;
a pixel electrode disposed on one side of the first insulating layer farthest away from the common electrode; and
a storage electrode disposed on a side of the common electrode closest to the first insulating layer or on a side of the common electrode farthest away from the first insulating layer, wherein an orthograph projection of the storage electrode on a plane where the substrate disposed is within an orthograph projection of the pixel electrode on the plane where the substrate disposed.

15. The liquid crystal display panel according to claim 14, wherein the storage electrode is connected to the common electrode.

16. The liquid crystal display panel according to claim 15, wherein the storage electrode is located on the side of the common electrode farthest away from the first insulating layer, and a surface of the storage electrode closest to the common electrode is in contact with the common electrode.

17. The liquid crystal display panel according to claim 14, wherein the array substrate has a light-emitting region, and a pattern of the storage electrode is same as a pattern of a part of the pixel electrode located in the light-emitting region.

18. The liquid crystal display panel according to claim 16, wherein the storage electrode and the common electrode are prepared by a same mask.

* * * * *